United States Patent
Blasko et al.

(10) Patent No.: US 11,745,438 B2
(45) Date of Patent: Sep. 5, 2023

(54) WAVEGUIDE FOR PLASTIC WELDING, ARRANGEMENT FOR PLASTIC WELDING, A WELDING METHOD AS WELL AS A MANUFACTURING METHOD OF A WAVEGUIDE

(71) Applicant: BRANSON Ultraschall Niederlassung der Emerson Technologies GmbH & Co. OHG, Dietzenbach (DE)

(72) Inventors: Marian Blasko, Piestany (SK); L'udovít Šipoš, Nové Mesto nad Váhom (SK)

(73) Assignee: BRANSON Ultraschall Niederlassung der Emerson Technologies GmbH & Co. OHG, Dietzenbach (DE)

( * ) Notice: Subject to any disclaimer, the term of this patent is extended or adjusted under 35 U.S.C. 154(b) by 0 days.

(21) Appl. No.: 17/711,763

(22) Filed: Apr. 1, 2022

(65) Prior Publication Data

US 2022/0219407 A1 Jul. 14, 2022

Related U.S. Application Data

(63) Continuation of application No. 16/284,714, filed on Feb. 25, 2019, now Pat. No. 11,318,687.

(30) Foreign Application Priority Data

Feb. 28, 2018 (DE) .......................... 102018104629.4

(51) Int. Cl.
*B29C 65/00* (2006.01)
*B23K 26/064* (2014.01)
(Continued)

(52) U.S. Cl.
CPC ...... *B29C 66/73921* (2013.01); *B23K 26/064* (2015.10); *B29C 65/1612* (2013.01);
(Continued)

(58) Field of Classification Search
CPC .......... B29C 66/73921; B29C 65/1612; B29C 65/1687; B23K 26/064
See application file for complete search history.

(56) References Cited

U.S. PATENT DOCUMENTS

| 4,747,651 A | 5/1988 | Wiesmeier |
| 8,075,725 B2 | 12/2011 | Hofmann et al. |

(Continued)

FOREIGN PATENT DOCUMENTS

| CN | 1732076 A | 2/2006 |
| CN | 101522399 A | 9/2009 |

(Continued)

OTHER PUBLICATIONS

CN Office Action for CN Application No. 201910146985.1 dated Sep. 20, 2022 (6 pages).

*Primary Examiner* — Daniel McNally
(74) *Attorney, Agent, or Firm* — Reising Ethington P.C.

(57) ABSTRACT

A waveguide for plastic welding has an entry end, an exit end as well as a first and a second inner face arranged between the entry end and the exit end, which are arranged opposite to each other and by means of which laser light can be reflected. A first distance between the entry end and the exit end defines a length of the waveguide and a second distance between the first and the second inner face defines a thickness of the waveguide. The exit end may be arranged opposite to the entry end and a central plane of the waveguide may extend centrally from the entry end to the exit end. The first inner face comprises a continuously curved, concave shape so that a third distance between the first inner face and the central plane varies continuously from the entry end in the direction of the exit end.

11 Claims, 9 Drawing Sheets

(51) Int. Cl.
  *B29C 65/16*   (2006.01)
  *G02B 6/10*    (2006.01)
  *G02B 6/42*    (2006.01)

(52) U.S. Cl.
  CPC ...... *B29C 65/1635* (2013.01); *B29C 65/1667* (2013.01); *B29C 65/1687* (2013.01); *B29C 66/12443* (2013.01); *B29C 66/12461* (2013.01); *B29C 66/12463* (2013.01); *B29C 66/12469* (2013.01); *B29C 66/54* (2013.01); *G02B 6/10* (2013.01); *G02B 6/4296* (2013.01); *B29C 66/8322* (2013.01)

(56) References Cited

U.S. PATENT DOCUMENTS

| | | |
|---|---|---|
| 2005/0121424 A1 | 6/2005 | Caldwell et al. |
| 2005/0205534 A1 | 9/2005 | Caldwell |
| 2007/0047932 A1* | 3/2007 | Caldwell ............ B29C 65/1487 |
| | | 392/419 |
| 2015/0343701 A1* | 12/2015 | Schiccheri .......... B29C 65/1667 |
| | | 156/272.8 |

FOREIGN PATENT DOCUMENTS

| | | |
|---|---|---|
| DE | 3509053 C1 | 8/1986 |
| GB | 2154504 A | 9/1985 |
| JP | S54108094 A | 8/1979 |
| JP | 2000121888 A | 4/2000 |

\* cited by examiner

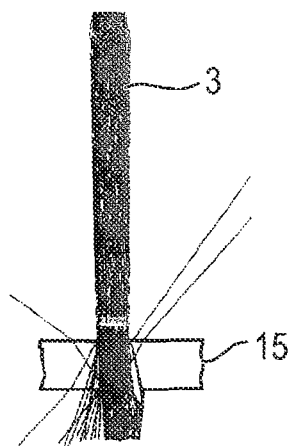
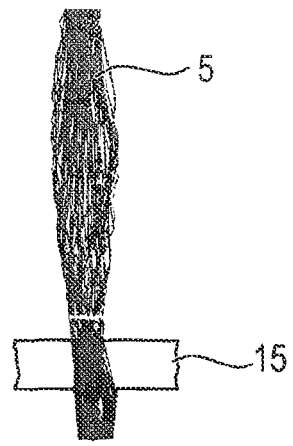
FIG. 3a | FIG. 3b
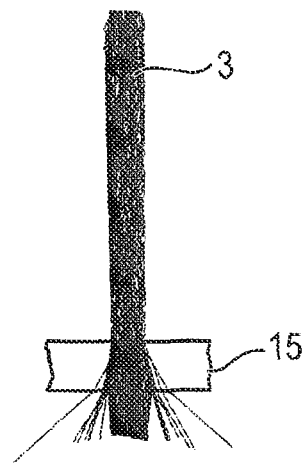
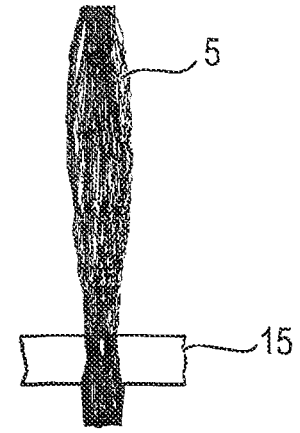
FIG. 4a | FIG. 4b
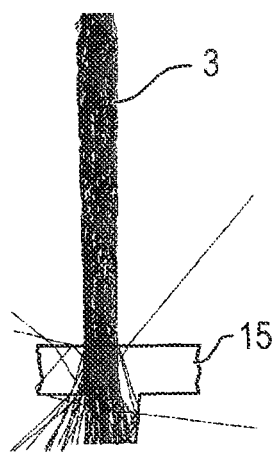
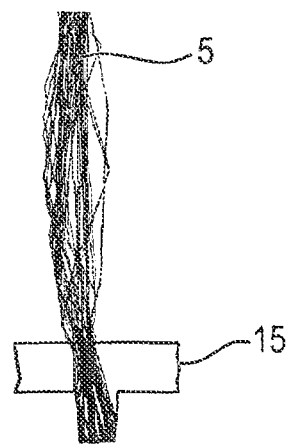
FIG. 5a | FIG. 5b

WAVEGUIDE FOR PLASTIC WELDING, ARRANGEMENT FOR PLASTIC WELDING, A WELDING METHOD AS WELL AS A MANUFACTURING METHOD OF A WAVEGUIDE

CROSS REFERENCE TO RELATED APPLICATIONS

This application is a continuation of U.S. patent application Ser. No. 16/284,714 filed on Feb. 25, 2019 and claims the priority of German patent application No. DE102018104629.4, filed on Feb. 28, 2018. The entire contents of these priority applications are incorporated herein by reference.

TECHNICAL FIELD

The present disclosure is related to a negative as well as a positive waveguide for plastic welding, an arrangement for plastic welding, a method for plastic welding as well as a manufacturing method of the waveguide.

BACKGROUND

Generally, several types of waveguides for laser light for plastic welding are known. Often, the last element of an arrangement for plastic welding is denoted as waveguide, before the laser light of a laser light source enters the components to be welded. The waveguide has at that especially the object to homogenize the distribution of the laser light so that the energy of the laser light enters the components to be welded as uniformly as possible and individual focal points are avoided.

At that, it is generally differentiated between two types of waveguide, namely the positive and the negative waveguides. Positive waveguides consists of a solid state which guides laser light in the interior following the law of total internal reflection. An example of such a positive waveguide is described in DE 10 2004 058 221 A1. Negative waveguides have the feature of a channel like cavity, which is coated with a reflective layer and in which the laser light is guided. An example of such a negative waveguide is described in DE 11 2007 002 109 T5. The negative waveguide described there has a non-conical longitudinal cross-section producing a non-circular weld zone. Further, negative waveguides having a conical longitudinal cross-section are also known.

With respect to the waveguide as usually last element of a welding arrangement prior to the components to be welded to each other it is thus desirable that energy losses due to the waveguide are kept as small as possible.

It is thus an object of the present invention to provide a waveguide at which the energy losses caused by the waveguide are smaller compared to the known waveguides and the waveguide provides a better energy distribution at the components to be welded to each other. Further, it is an object of the present invention to provide a respective arrangement, a respective welding method as well as respective manufacturing methods of the waveguide.

SUMMARY

A first negative waveguide for plastic welding, especially for laser transmission welding, comprises: an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a second distance between the first and the second inner face defines a thickness of the waveguide, wherein the exit end is arranged opposite to the entry end and a central plane of the waveguide extends centrally from the entry end to the exit end, and the first inner face comprises a continuously curved, concave shape so that a third distance between the first inner face and the central plane of the waveguide varies continuously from the entry end in the direction of the exit end.

The first negative waveguide is described in the following as part of its usage in an arrangement for plastic welding, especially in an arrangement for laser transmission welding. Laser transmission welding is a one-step process in which the heating of the components to be welded and the joining process take place almost at the same time. For this process, one of the components to be welded must have a high transmittance or transmission degree in the range of the laser wave length and the other must have a high absorptance or absorptivity. Prior to the welding process, both components are positioned in the desired end position and the joining pressure is applied. The laser beam radiates or shines through the transparent component without considerable heating. At first in the absorption component the laser beam is absorbed in a surface near layer, wherein the laser energy is converted in thermal energy and the absorption component is melted at these places. Due to thermal conduction processes, also the transparent component is plasticized in the area of the joining zone. By means of the joining force applied from the outside as well as the inner joining pressure resulting from the expansion of the plastic melt, an adhesive bond connection of the two components is achieved. Here, it may be preferred to use the first negative waveguide as part of a simultaneous laser transmission welding which is subsequently also denoted as simultaneous welding.

At the simultaneous welding, the whole welding contour or seam contour of the components to be welded to each other may be irradiated at the same time. This ensures an extreme reduction of the process times and makes a bridging of the clearances possible by means of melting away. Additionally, the welding seam is stronger compared to the contour welding in which a laser beam is guided along the seam as the simultaneous welding has a higher interaction time.

During the operation of a respective arrangement for plastic welding, especially for laser transmission welding, laser light runs from a laser light source through an often flexible light guide or a bundle of flexible light guides which is coupled at its end facing away from the laser light source to the waveguide. The laser light exits thus the light guide or the bundle of light guides and enters the waveguide, is homogenized in the waveguide and impinges on the components to be welded thereafter.

As has been outlined at the beginning, the negative waveguide is marked by a cavity through which the laser light is guided. Usually, the negative waveguide has a channel like design or construction. The first negative waveguide comprises the entry end, the exit end, a first reflecting inner face and a second reflecting inner face opposite to the first inner face. The entry face of the entry end is defined especially by the plane in which the first ends of the first and second inner faces at the entry end of the waveguide are arranged. Advantageously the laser light enters the waveguide at the entry end perpendicular to the entry face. The exit end with the exit face is thus respectively and preferably defined by the plane in which the second ends of the first and second inner face at the exit end of the waveguide are arranged. In a further embodiment, the exit face and the entry face are arranged in planes which extend parallel to each other.

The exit end may be adapted to a desired seam contour of the components to be welded. For example, and in the case of two longitudinal components to be welded to each other, the waveguide has a longitudinal shape transverse to the direction of the laser light passing through the waveguide. An extension of the first negative waveguide in this direction is also defined as width. According to a further example and in case two annular shaped components have to be welded to each other, the exit end and thus also the exit face are also annular.

Furthermore, the central plane of the waveguide extends centrally between the entry end and the exit end in the direction of the laser light starting from the entry end to the exit end. Centrally from the entry end to the exit end refers here to the geometric center of the respective end or the respective face. With respect to the exemplarily first negative waveguide having a longitudinal shape transverse to the direction of the laser light, the thickness, i.e. the second distance between the inner faces, is at the entry end as well as at the exit end for example 5 mm. The central plane would then have a distance to the first and the second inner face of 2.5 millimeters at the entry end and at the exit end, which will be discussed below with respect to the detailed description of a preferred embodiment. According to another example, the thickness is equal at the entry end as well as at the exit end and may be below 3 mm, or below 2.8 mm. In an alternative, the thickness at the entry end may be larger compared to the thickness at the exit end. For example, the thickness at the entry end may be between 2.2 to 2.8 mm whereas the thickness at the exit end is 1.4 mm.

According to the disclosure, the first inner face comprises the continuously curved, concave shape. In the cross-section of the waveguide, the first inner face is thus curved to the outside. This continuously curved concave shape may be part of an ellipse. Due to this design or shaping of the first inner face, the third distance between the first inner face and the central plane of the waveguide varies continuously from the entry end in the direction of the exit end. The second inner face extends in a first alternative in a straight line. In other embodiments, the second inner face has other shapes, may also be a continuously curved shape, which is formed by a plurality of straight segments or which is part of an ellipse, for example of a second ellipse. At the exemplarily straight-lined design of the second inner face, a fourth distance between the central plane and the second inner face is constant or invariable, wherein not only the third distance but also the thickness of the waveguide varies continuously due to the shape of the first inner face.

In other embodiments, the first negative waveguide is a section of a waveguide portion or an integral part of a waveguide. For example, prior to the entry end and/or after the exit end, a further straight-lined waveguide is present. The first entry end begins in this case where the first inner face starts having a concave shape. Accordingly, the exit end is present where the first inner face ends having a concave shape.

An advantage of this construction is that the beams of the laser light have less interaction with each other in the waveguide compared to a waveguide with straight inner faces. Further, the laser light can be bundled more powerful at the exit end by means of the inventive first negative waveguide. By means of the first negative waveguide, an especially homogeneous power density distribution can thus be achieved at the welding seam. In this way, a larger tolerance between waveguide and the components to be welded can be compensated which increases the simplicity of the usage of an arrangement using the inventive first negative waveguide. Especially, tolerances of up to ±1 mm between waveguide and the desired welding seam of the components to be welded can be compensated by means of the first negative waveguide. Furthermore, the first negative waveguide allows the transit of more energy compared to a straight waveguide. This applies also, in case the surface of the waveguide is not polished.

A first positive waveguide for plastic welding, especially for laser transmission welding, comprises: an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a second distance between the first and the second inner face defines a thickness of the waveguide, wherein the exit end is arranged opposite to the entry end and a central plane of the waveguide extends centrally from the entry end to the exit end, and the first inner face comprises a continuously curved, concave shape so that a third distance between the first inner face and the central plane of the waveguide varies continuously from the entry end in the direction of the exit end.

The above statements regarding the first negative waveguide apply analogously to the first positive waveguide. A difference between the first negative waveguide and the first positive waveguide is that the positive waveguide consists of a solid state or solid body. The solid state comprises the entry end and the exit end. The first and the second inner face are formed by a first and a second inner side of a first and a second side face of the solid state. The material of the solid state is chosen such that in the interior of the solid state and especially at the first and the second inner face total reflection occurs. The advantages which can be achieved by means of the first positive waveguide correspond thus to the advantages which can be achieved with the inventive first negative waveguide. Further, by means of the positive waveguide, the energy can be transferred through the waveguide to the parts to be welded without refraction. Additionally, the positive waveguide is specifically useful in applications having, for example, limited installation space. Further, pressure can be applied directly to the work pieces to be welded by means of the positive waveguide, for example when welding thin sheets of one material to another material.

In a further embodiment of the first negative and the first positive waveguide, the third distance increases or decreases continuously from the entry end in the direction of the exit end. If the third distance increases from the entry end in the direction of the exit end, the thickness at the entry end is smaller compared to the exit end. If the third distance decreases from the entry end in the direction of the exit end, the thickness at the entry end is larger compared to the exit end. In this context, it may be preferred if the third distance first increases continuously from the entry end in the direction of the exit end up to an apex or vertex and thereafter decreases continuously. This means, with respect to the third distance, that the third distance first increases from the entry end in the direction of the exit end up to the apex and then decreases. Here, also different constructions are possible.

According to an example, the thickness at the entry end is larger or smaller compared to the exit end. According to a further embodiment, the thickness at the exit end corresponds to the thickness at the entry end. Thus, the exit end as well as the entry end can be specifically adapted to the respective requirements and it results an especially large range use for the first negative and the first positive waveguide.

In a further embodiment of the first negative and the first positive waveguide, the second inner face is formed mirror-symmetrically to the first inner face. The central plane of the waveguide is used as mirror plane. In this way, the second inner face is constructed like the first inner face so that both have a continuously curved concave shape. A fourth distance between the second inner face and the central plane of the waveguide varies thus from the entry end in the direction of the exit end also continuously. Especially, the thickness of the waveguide varies in this way continuously, and the thickness may increase from the entry end in the direction of the exit end up to an apex and thereafter decrease. By means of this mirror-symmetrical configuration, the interaction between the laser beams in the waveguide is further decreased and the power density distribution in the weld seam is also further improved.

In a further embodiment of the first negative and the first positive waveguide, the thickness at the entry end is between 8% and 25%, preferably 10% to 20% of the length of the waveguide. Additionally or alternatively, the third distance may increase from the entry end in the direction of the exit end up to an apex and decreases thereafter, wherein the apex is arranged with respect to the length in a range between ¼ and ¾ of the length of the waveguide, preferably in a range between ⅓ and ⅔ and especially preferred at about ½. Further, the thickness at the exit end corresponds or may be equal to the thickness at the entry end. It also may be preferred that the third distance increases from the entry end in the direction of the exit end up to an apex and decreases thereafter and the thickness in the apex is about 1.2- to 2-times, preferably 1.4- to 1.8-times and especially preferred 1.6-times the thickness at the entry end. In a further embodiment, the second inner face is mirror symmetrical to the first inner face, as explained above. Each of these features taken alone realizes an improvement of the power density distribution in the welding seam of the components to be welded.

According to a further embodiment, the continuously curved concave shape of the first inner face is part of an ellipse. In case of a mirror-symmetrical configuration of the second inner face, this applies also to the second inner face. In case of a non-mirror-symmetrical configuration of the second inner face, the second inner face may have a continuously curved shape which is part of a second, further ellipse. An ellipse has a large axis and a small axis. The apexes on the large axis are denoted as main vertexes and the apexes on the small axis are denoted as sub-vertexes or auxiliary vertexes. The foci of the ellipse, i.e. the first and the second focal point, are arranged on both sides of the central point of the ellipse on the large axis. The ellipse is thus defined as the geometrical place of all points for which the sum of the distances from the foci, i.e. the sum of the focal radii, is constantly equal to the distance between the main vertexes. With respect to the above discussed embodiments with vertex, the vertex may correspond to a sub-vertex of the ellipse. Due to this, a more longitudinal shaping results in the cross-section of the waveguide, which supports the transmission and homogenization of the laser light advantageously. Generally, due to the usage of a part or section of an ellipse, the interaction between laser beams and the inner faces of the waveguide is further reduced, especially compared to a straight-lined waveguide. This applies especially if the second inner face is formed mirror-symmetrical to the first inner face. Particularly by means of this embodiment, more energy can be transferred through the waveguide compared to a straight waveguide. This applies also, in case the surface of the waveguide is not polished.

An second negative waveguide for plastic welding, especially for laser transmission welding comprises: an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a second distance between the first and the second inner face defines the thickness of the waveguide, and the first inner face comprises a continuously curved concave shape which is part of a first spiral, especially a first natural spiral, so that a radius of the first spiral from a point of origin of the first spiral to the first inner face varies continuously along the waveguide.

With respect to the term of the negative waveguide as well as the laser transmission welding, it is referred to the above illustrations with respect to the inventive first negative waveguide. The second negative waveguide can be used in an arrangement for plastic welding analogously to the first inventive waveguide. Differences between the first negative waveguide and the second negative waveguide are the shaping of the first inner face as well as the arrangement of the entry end with respect to the exit end.

In contrast to the first negative waveguide, the entry end of the second negative waveguide has not to be arranged opposite to the exit end. It is rather decisive that the first inner face has the continuously curved concave shape which is part of the first spiral. A spiral as two-dimensional figure is generally defined in that the radius of the spiral from its point of origin varies continuously. This distinguishes the spiral for example from a circle in which the radius is always constant. The radius of the first spiral varies or changes due to the design of the first inner face from its point of origin to the first inner face along the waveguide continuously, which will be discussed later within the detailed description of a preferred embodiment.

The second inner face may extend between the entry end and the exit end straightly or in straight segments. In an alternative, the second inner face can also be formed curved. In the configuration with straight segments as well as in the curved configuration, it may be preferred that the space between the first and second inner face is not larger than the space in case of a second inner face extending straightly between entry end and exit end. A curvature of the second inner face thus may be convex.

An advantage of the second negative waveguide is that lower energy losses occur in the interior of the waveguide and the laser light can be guided especially effectively through the waveguide to a welding seam. Thereby, and compared to known waveguides, more welding energy is provided at the weld seam of the components to be welded to each other, especially if the components have an undercut at the welding seam. Further, and with respect to a closed angular or cornered shape of the waveguide, especially at the corners of the entry end a collision of the light guides can be avoided due to the spiral shape of the first inner face in this area. This makes the arrangement more simply usable compared to the known arrangements.

An second positive waveguide for plastic welding, especially for laser transmission welding comprises: an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a second distance between the first and the second inner face defines the thickness of the waveguide, and the first inner face comprises a continuously curved concave shape which is part of a first spiral, especially a first natural spiral, so that a radius of the first spiral from a point of origin of the first spiral to the first inner face varies continuously along the waveguide.

The above illustrations with respect to the second negative waveguide apply analogously to the second positive waveguide. With respect to the construction of a positive waveguide compared to a negative waveguide, it is referred to the above explanation for the first positive waveguide, which apply also to the second positive waveguide. In summary, the advantages which can be achieved with the second positive waveguide correspond thus to the advantages which can be achieved with the second negative waveguide.

In a further embodiment of the second negative and the second positive waveguide, the radius of the first spiral increases or decreases continuously from the point of origin of the first spiral to the first inner face along the waveguide from the entry end to the exit end. In this way, curvatures of the first inner face of the waveguide which are adapted to the respective case of application are obtainable.

Further, an angle in the range of 30° to 150°, preferably 40° to 120° may be enclosed between the entry end and the exit end, especially between the entry face and the exit face. The laser light from the light guide may enter the waveguide perpendicular to the entry face and exits the waveguide perpendicular to the exit surface. Based on the desired angle for the respective case of application, for example due to undercuts being present at the components to be welded, as well as on the available installation space, the desired section of the spiral can be chosen to realize the concave shape of the first inner face.

In a further embodiment, a central plane is defined between the first and the second inner face, the distance of which is constant to the first and the second inner face along the length of the waveguide so that the second inner face also has a continuously curved shape. This shape of the second inner face is part of a second spiral, especially a second natural spiral so that a radius of the second spiral from a point of origin of the second spiral to the second inner face varies continuously along the wave guide. Due to this configuration, the laser light can be guided very effectively within the waveguide.

Further, the thickness of the waveguide may decrease continuously from the entry end in the direction of the exit end. In this way, a further focus effect of the laser light from the entry end in the direction of the exit end is achieved.

The concave continuously curved shape, which is part of a spiral, may be chosen from one of the following spiral types: hyperbolic, Archimedean, logarithmic or from a spiral based on the Fibonacci-sequence. The Fibonacci-sequence is the sequence $(F_n)_{n \in N}$ with $F_1=F_2=1$ and $F_{n+2}=F_n+F_{n+1}$. The spiral based on the Fibonacci-sequence is a subset of the logarithmic spiral. By means of this configuration, laser light can be guided through the waveguide with very low losses, especially to an undercut of the components to be welded.

A curve which intersects all beams starting from the point of origin 0 in the same angle $\alpha$ is defined as logarithmic spiral. In case of the logarithmic spiral and if a sub-section of the spiral is present, the point of origin can be determined when the angle $\alpha$ is known. As a spiral is a two-dimensional figure, the waveguide has to be viewed here in cross-section. A direction vector of the straight line extends in this case from the first inner face in the direction of the second inner face. If the shape of the second inner face is also based on a spiral, the direction vector of the respective straight line shows away from the first inner face.

A third negative waveguide for plastic welding, especially for laser transmission welding comprises: an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a second distance between the first and the second inner face defines the thickness of the waveguide, and the first inner face comprises a continuously curved concave shape which is part of a first curve. Especially, the first curve may be defined by a circle, a parabola, an exponential function or any other curve. Accordingly, the curved concave shape may be part of a circle, a parabola or an exponential function. With respect to further features and the advantages, it is referred to the inventive second negative waveguide.

A third positive waveguide for plastic welding, especially for laser transmission welding comprises: an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a second distance between the first and the second inner face defines the thickness of the waveguide, and the first inner face comprises a continuously curved concave shape which is part of a first curve. Concerning further possible features, it is referred to the third negative waveguide as well as the second positive waveguide. In particular, and with respect to the advantages, it is referred to the second positive waveguide.

An arrangement for plastic welding, especially for laser transmission welding, comprises: a laser light source, a light guide, which may be a plurality of light guides, and a waveguide, wherein in the operation of the arrangement the laser light passes from the laser light source through the light guide and subsequently through the waveguide. The arrangement uses the above-described inventive waveguide so that the above-described advantages for the respective waveguide apply analogously to the arrangement.

In an advantageous embodiment of the arrangement and upon usage of the second negative or positive waveguide, a length of the first inner face of the second or third negative or positive waveguide is in the range of 3-times to 4-times, especially of 3.5-times, of a distance between the individual light guides from the plurality of light guides. In this way, an especially compact construction of the waveguide can be achieved.

A method for plastic welding, especially for laser transmission welding, with an arrangement comprises the following steps: arranging two plastic components to be welded to each other in a mounting device, creating laser light by means of a laser light source, wherein the laser light passes through the light guide, may be a plurality of light guides, and subsequently through a waveguide, and welding the plastic components to be welded to each other by means of the laser light exiting the waveguide.

A first manufacturing method is related to the manufacturing of the first, second or third negative waveguide. The first manufacturing method comprises the steps of: providing a first and a second inner face, applying a reflecting layer on the first and the second inner face, arranging the first and the second inner face such that they are opposite to each other, wherein a first end of the first and the second inner face define an entry end of the waveguide, which defines an entry face for laser light, and a second end of the first and the second inner face define an exit end of the waveguide, which defines an exit face for laser light, wherein a first distance between the entry end and the exit end defines a length of the waveguide and a second distance between the first and the second inner face defines a thickness of the waveguide, wherein the exit end is arranged opposite to the entry end and a central plane of the waveguide extends centrally from the entry end to the exit end while the first inner face has a continuously curved concave shape so that a third distance between the first inner face and the central plane of the waveguide varies continuously from the entry end in the direction of the exit end or the first inner face has a continuously curved concave shape which is part of a first spiral, especially a first natural spiral so that the radius of the first spiral varies continuously from a point of origin of the first spiral to the first inner face along the waveguide or the first inner face has a continuously curved concave shape which is part of a first curve. By means of the manufacturing method, the first, second and third negative waveguide can be manufactured so that it is referred to the above explanations for the respective first, second and third negative waveguide with respect to the respective advantages.

A second manufacturing method is related to the manufacturing of the first or second positive waveguide. The second manufacturing method comprises the steps of: providing a solid state of a light guiding material, wherein the solid state comprises an entry end defining an entry face for laser light and an exit end defining an exit face for laser light, wherein the solid state has a first side face defining a first inner face and a second side face defining a second inner face wherein the first and the second inner face are arranged opposite to each other and the solid state consists of a material which provides a total reflection of laser light at the first and the second inner face while a first distance between the entry end and the exit end defines a length of the waveguide and a second distance between the first and the second inner face defines a thickness of the waveguide, wherein the exit end is arranged opposite to the entry end and a central plane of the waveguide extends centrally from the entry end to the exit end and the method comprises the step of: forming the first side face such that the first inner face has a continuously curved concave shape so that a third distance between the first inner face and the central plane of the waveguide varies continuously from the entry end in the direction of the exit end or the method comprises the further step of: forming the first side face such that the first inner face has a continuously curved concave shape which is part of a first spiral, especially a first natural spiral, so that a radius of the first spiral from a point of origin of the first spiral to the first inner face varies continuously along the waveguide or the method comprises the further step of: forming the first side face such that the first inner face has a continuously curved concave shape which is part of a first curve. By means of the second manufacturing method, the inventive first, second and third positive waveguide can be manufactured so that it is referred to the above statements for the respective first, second and third positive waveguide with respect to the respective advantages.

BRIEF DESCRIPTION OF THE DRAWINGS

In the following, the present disclosure will be described in detail based on the drawings. In the drawings, the same reference signs denote the same elements and/or components. It shows:

FIG. 3a shows the course of laser light in a straight negative waveguide according to the prior art in a cross-sectional view at precise alignment of the waveguide with the welding seam, FIG. 3b shows the course of laser light in an embodiment of the first negative waveguide according to FIG. 1 in a cross-sectional view at precise alignment of the waveguide with the welding seam, FIG. 4a shows the course of laser light in a straight negative waveguide according to the prior art in a cross-sectional view at a displacement of 0.5 mm of the waveguide with respect to the welding seam, FIG. 4b shows the course of laser light in the embodiment of the first negative waveguide according to FIG. 1 in a cross-sectional view at a displacement of 0.5 mm of the waveguide with respect to the welding seam, FIG. 5a shows the course of laser light in a straight negative waveguide according to the prior art in a cross-sectional view at a displacement of 1.0 mm of the waveguide with respect to the welding seam, FIG. 5b shows the course of laser light in the embodiment of the first negative waveguide according to FIG. 1 in a cross-sectional view at a displacement of 1.0 mm of the waveguide with respect to the welding seam.

DETAILED DESCRIPTION

Generally, the waveguides described in the following can be used in any process in which laser light has to be guided to a welding zone. Exemplarily, the usage of the waveguide is explained in an arrangement for plastic welding, especially for laser transmission welding. For reasons of clarity, also the embodiments of the negative waveguide according to the present disclosure are described, wherein the respective embodiments apply analogously to positive waveguides. Furthermore, the embodiments described in the following must not define an individual waveguide but may be a section of a waveguide portion or an integral part of a waveguide. According to an example, an especially straight-lined waveguide is present prior to the entry end and/or after the exit end. The first entry end is present in this case where the first inner face starts having a concave shape. Accordingly, the exit end is present where the first inner face ends having a concave shape.

At the laser transmission welding, a first component of plastic, which is often denoted as transmission component, is welded to a second component, which is often denoted as absorption component, by means of laser light and with the application of pressure. The transmission component or a portion of the transmission component is arranged adjacent to the waveguide as the laser beam shines through it without considerable heating. The absorption component or a portion of the absorption component is arranged on the side of the transmission component or the portion of the transmission component which is opposite to the waveguide. At first in the absorption component the laser light is absorbed in a surface near layer, wherein the laser energy is converted in thermal energy and the absorption component is melted at these places. The waveguide is used for example for applying the necessary joining pressure. Due to thermal conduction processes, also the transparent component is plasticized in the area of the joining zone. By means of the joining pressure applied from the outside as well as the inner joining pressure resulting from the expansion of the plastic melt, an adhesive bond connection of the two components is achieved. Here, it may be preferred to use the negative and positive waveguides as part of a simultaneous laser transmission welding. In this method, the whole welding contour or seam contour of the components to be welded to each other may be irradiated at the same time. This ensures an extreme reduction of the process times and makes a bridging of the clearances possible by means of melting away. Additionally, the welding seam is stronger compared to the contour welding in which a laser beam is guided along the seam as the simultaneous welding has a higher interaction time.

Figure 1:
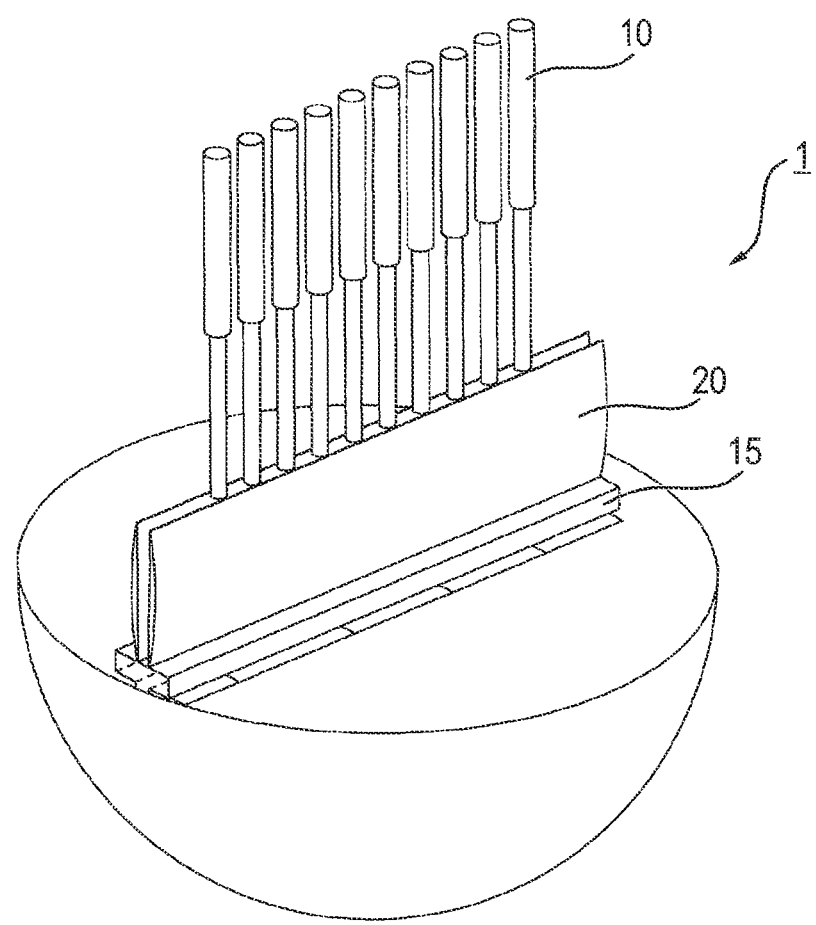
FIG. 1 shows an embodiment of an arrangement for plastic welding with an embodiment of the first negative waveguide in a perspective view.

Now referring to FIG. 1, an embodiment of an arrangement 1 for plastic welding with an embodiment of a first negative waveguide 20 is shown in a perspective view. In the arrangement 1, laser light is guided from a laser light source via a plurality of preferably flexible light guides 10 to the waveguide 20. The light guides 10 are connected at an entry end 22 with the waveguide 20. The laser light is guided through the waveguide 20 to the components to be welded, one component 15 of which is exemplarily shown. At that, it is one object of the waveguide 20 to homogenize the laser light from the light guides so that the power density distribution of the laser light in the welding zone or welding seam is as uniformly as possible.

Figure 2:
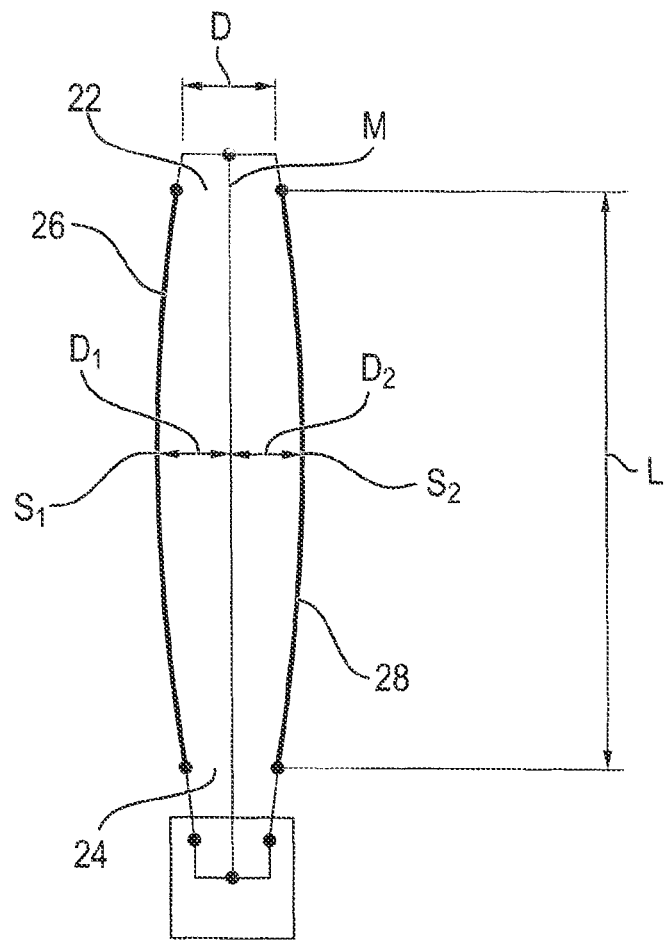
FIG. 2 is a cross-section of the embodiment of the first negative waveguide according to FIG. 1.
Figure 6A:
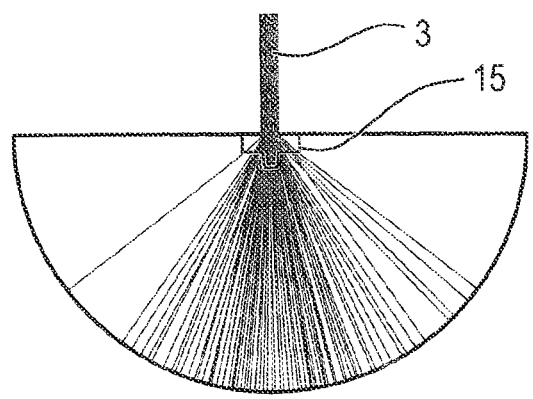
FIG. 6a shows the course of laser light after the component to be welded when using a straight negative waveguide according to the prior art.
Figure 6B:
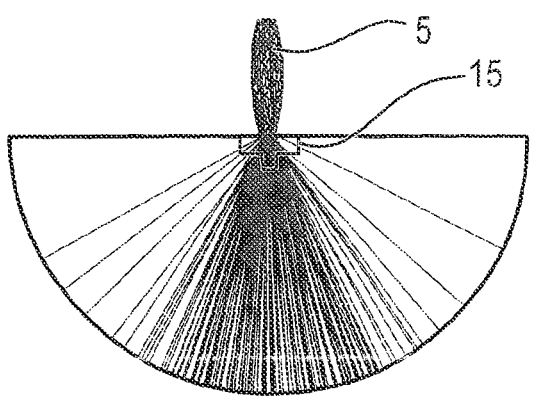
FIG. 6b shows the course of the laser light after the component to be welded when using the embodiment of the first negative waveguide according to FIG. 1.

Additionally referring to FIG. 2, which shows a cross sectional view of the embodiment of the first negative waveguide according to FIG. 1, the construction of the waveguide 20 is described. The waveguide 20 comprises the entry end 22 defining an entry face for the laser light. Opposite to the entry end 22, the waveguide 20 comprises an exit end 24 defining an exit face for the laser light. A first 26 and a second inner face 28 extend between the entry end 22 and the exit end 24. The two inner faces 26 and 28 are arranged opposite to each other and reflect the laser light during operation of the arrangement 1.

The entry face of the entry end 22 is defined by the plane in which the first ends of the first 26 and second inner face 28 are arranged at the entry end 22 of the waveguide 20. In the embodiment shown, the laser light enters the waveguide 20 perpendicular to the entry face at the entry end 22. The exit end 24 with the exit face is defined, analogously to the entry face, by the plane in which the second ends of the first 26 and the second inner face 28 are arranged at the exit end of the waveguide 20. In the embodiment shown, the exit face and the entry face are arranged in planes which extend parallel to each other.

The exit end 24 is adapted in the embodiment shown to a desired seam contour of the components 15 to be welded so that the waveguide 20 has a longitudinal shape transverse to the direction of the laser light passing through the waveguide 20. An extension of the first negative waveguide in this direction is defined as width. In an alternative embodiment, the exit face has another shape. For example, the exit end and thus also the exit face are annular to weld two annular components to each other. In this case, the entry end and the entry face are formed analogously so that they are still arranged opposite to the exit end and the exit face.

Due to the configuration of the waveguide 20 as negative waveguide 20, a cavity is present between the two inner faces 26 and 28 and the two inner faces are provided with a reflecting layer. Usually, the negative waveguide 20 has thus a channel like shape. In case of a positive waveguide consisting of a solid state, no cavity would be present between the two inner faces. At the respective positive waveguide, it is ensured by the choice of the appropriate material that total reflection occurs in the interior of the waveguide, especially at the inner faces.

A first distance between the entry end 22 and the exit end 24 defines a length L of the waveguide 20. A second distance between the first 26 and the second inner face 28 defines a thickness D of the waveguide. Further, a central plane M of the waveguide 20 extends centrally from the entry end 22 to the exit end 24. Centrally from the entry end 22 to the exit end 24 refers here to the geometric center. With respect to the waveguide 20 shown having a longitudinal shape transverse to the direction of the laser light, the thickness D, i.e. the second distance between the inner faces 26, 28, is at the entry end 22 as well as at the exit end 24 for example 5 mm. The central plane M would then have a distance to the first 26 and the second inner face 28 of 2.5 millimeters. In this example, it is assumed that the thickness at the exit end 24 corresponds or is equal to the thickness at the entry end 22.

Other configurations are possible so that the thickness at the entry end 22 is larger or smaller compared to the exit end 24 in other embodiments.

As can be seen especially from FIG. 2, the first inner face 26 comprises a continuously curved, concave shape. In the cross-section of the waveguide 20, the first inner face 26 is thus curved to the outside. In the embodiment shown, this continuously curved concave shape is part of an ellipse. Due to this configuration of the first inner face 26, a third distance $D_1$ between the first inner face 26 and the central plane M of the waveguide 20 varies continuously from the entry end 22 in the direction of the exit end 24.

In the embodiment shown, the second inner face 28 is formed mirror symmetrical to the first inner face 26. The central plane M of the waveguide 20 servers as mirror plane. In this way, the second inner face 28 is constructed like the first inner face 26 so that both have a concave shape. A fourth distance $D_2$ between the second inner face 28 and the central plane M of the waveguide 20 varies thus also continuously from the entry end 22 in the direction of the exit end 24. Other shapes of the second inner face 28 can also be realized, as for example a straight shape or a shape consisting of a plurality of straight segments.

As can be also seen in FIG. 2, the third distance $D_1$ first increases continuously from the entry end 22 in the direction of the exit end 24 up to an apex or vertex $S_1$ and thereafter decreases continuously. Due to the mirror symmetrical configuration, this applies also to the second inner face 28 which has a second vertex $S_2$. By means of this mirror symmetrical configuration, the interaction between the laser beams in the waveguide 20 is further reduced and the power density distribution in the welding seam is also further increased, which will be explained in detail based on the following FIGS. 3a to 8a.

The continuously curved, concave shape of the first inner face 26 and thus also of the second inner face 28 is part of an ellipse. An ellipse has a large axis and a small axis. In the embodiment shown, the large axis lies in the central plane M and the small axis extends through the vertexes $S_1$ and $S_2$. The apexes on the large axis are denoted as main vertexes and the apexes on the small axis, here the vertexes $S_1$ and $S_2$, are denoted as sub-vertexes or auxiliary vertexes. The central point of the ellipse is in the point of intersection of the large and the small axis. The foci of the ellipse are arranged on both sides of the central point of the ellipse on the large axis, i.e. the first and the second focal point. The foci are thus arrange in the central plane M.

The ellipse is defined as the geometrical place of all points for which the sum of the distances from the foci, i.e. the sum of the focal radii, is constantly equal to the distance between the main vertexes. This definition is reproduced in the following equation (7). For the ellipse, the following equations apply:

$$\frac{x^2}{a^2} + \frac{y^2}{b^2} = 1 \quad (1)$$

$$x = a * \cos(t) \quad (2a)$$

$$y = b * \sin(t) \quad (2b)$$

$$c = \sqrt{a^2 - b^2} \quad (3)$$

$$e = \frac{c}{a} \quad (4)$$

$$r_1 = a - e * x \quad (5)$$

$$r_2 = a + e * x \quad (6)$$

$$r_1 + r_2 = 2a. \quad (7)$$

It is:
x, y the coordinates of a point on the ellipse,
a the distance between main vertex and central point of the ellipse,
b the distance between sub-vertex and central point of the ellipse,
t angle starting from a main vertex,
c distance between the foci,
e orbital eccentricity of the ellipse,
$r_1$ focal radius of the first focal point and
$r_2$ focal radius of the second focal point.

In the embodiment shown, the thickness D at the entry end is about 15% of the length L of the waveguide 20. Advantageous are values between 8% and 25%, preferably 10% to 20% of the length of the waveguide 20. The vertexes $S_1$ and $S_2$ are arranged at the half of the length L. Here, the arrangement of the vertexes in a range between ¼ and ¾ of the length of the waveguide 20 is advantageous, wherein the arrangement in a range between ⅓ and ⅔ is preferred. The thickness in the vertex is in the embodiment shown 1.6-times the thickness at the entry end 22, wherein values between 1.2-times to 2-times are advantageous and values between 1.4-times and 1.8-times are preferred. Each of these features taken alone realizes an improvement of the power density distribution in the welding seam of the components to be welded.

For an exemplarily calculation and based on the above relations, the following is assumed:
thickness D at the entry end and at the exit end: 5 mm
thickness D at the vertexes $S_1$ and $S_2$: 8 mm and
length L of the waveguide: 33.33 mm.
From this, the following known values for the ellipse result:

| b: | 4 mm |
|---|---|
| first point (x, y): | +16.67 mm, +2.5 mm |
| second point (x, y): | −16.67 mm, +2.5 mm |
| third point (x, y): | +16.67 mm, −2.5 mm |
| third point (x, y): | +16.67 mm, −2.5 mm |

The positive y-values of 2.5 mm at the x-values+16.67 mm and −16.67 mm belong to the first inner face 26 and the negative y-values belong to the second inner face 28, respectively. In the following, the first point (16.67 mm, 2.5 mm) is used for calculating the ellipse. As the thickness at the entry end 22 and at the exit end 24 are equal and the inner faces 26, 28 are mirror symmetrical, this single point is sufficient to calculate the ellipse based on the above known values and thus to calculate the course of the first 26 and the second inner face 28.

First, the equation (2b) is solved for sin(t), wherein a value of 0.625 results for sin(t). The value for t is thus 0.675, which corresponds to an angle of 38.68°. The value for t=0.675 is plugged in equation (2a), which is solved for a. From this, a value for a of 21.35 mm results so that the main vertexes are 42.70 mm apart. The distance between the foci according to equation (3) is thus c=20.98 mm. The foci are thus arranged on the x-axis at values of +10.49 mm and −10.49 mm. As orbital eccentricity a value of e=0.982 results according to equation (4). Based on this, the parameters of the ellipse are now known.

Now referring to FIGS. 3a to 5b, the course of laser light in a waveguide having solely straightly extending inner faces and the inventive waveguide 20 are compared. At this, FIGS. 3a, 4a and 5a refer to the waveguide with straight inner faces and thus to a straight course 3 of laser light. The FIGS. 3b, 4b and 5b are related to an embodiment of the inventive waveguide 20 and thus to an elliptically-shaped course 5 of light. Further, the behavior of the laser light after exiting the waveguide is shown at no displacement, i.e. displacement 0 mm, between waveguide and component (FIG. 3), 0.5 mm displacement (FIG. 4) and 1.0 mm displacement (FIG. 5). As can already be seen based on the comparison of FIGS. 3a and 3b, the laser light can be bundled better in the component 15 by means of the inventive waveguide 20. This effect is extremely measurable with increasing displacement so that in the depiction of FIG. 5a and upon the usage of the waveguide with straightly extending inner faces, a major part of the laser light does not reach the welding zone. In contrast to this, even at a displacement of 1.0 mm between component 15 and the embodiment of the waveguide 20, the laser light reaches the welding zone as shown in FIG. 5b. In the examples shown the welding zone is arranged in a portion of the T-shaped component 15 which faces away from the waveguide.

Figure 7A:
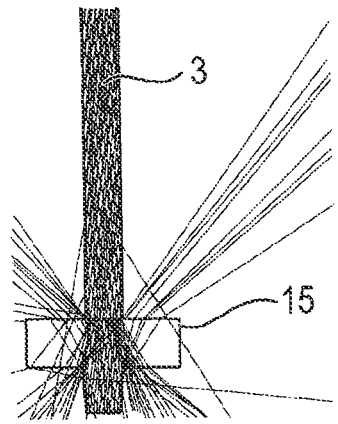
FIG. 7a is an enlarged view of a section of FIG. 6a, FIG. 7b is an enlarged view of a section of FIG. 6b.
Figure 7B:
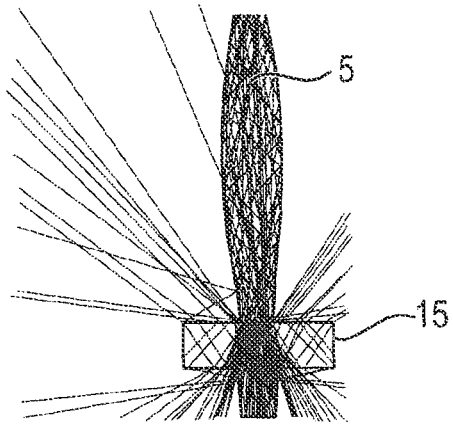

Further referring to FIGS. 6b to 7b, the course of laser light after the component 15 is shown. Again, the FIGS. 6a and 7a refer to the waveguide with straight inner faces and the FIGS. 6b and 7b refer to the embodiment of the inventive waveguide 20. It can be clearly seen that the laser light with the waveguide 20 is separated in three strands after the component 15. This indicates again that a better power density distribution of the laser light in the welding zone is present. The FIGS. 7a and 7b show respectively enlarged sections of FIGS. 6a and 6b.

Figure 8A:
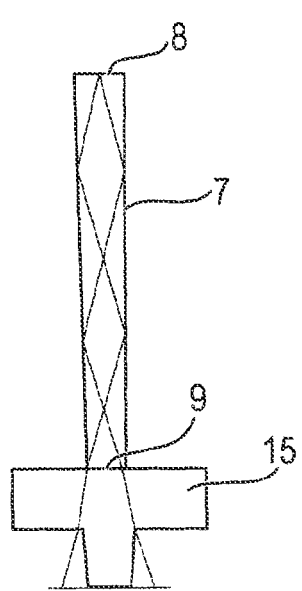
FIG. 8a is a cross-section of a straight negative waveguide according to the prior art with two laser beams for clarifying the interaction of the laser beams with each other.
Figure 8B:
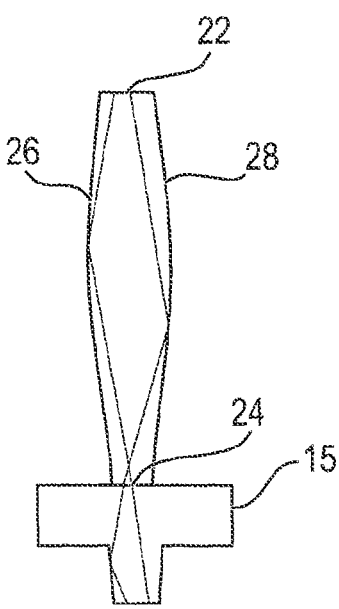
FIG. 8b is a cross-section of the embodiment of the first negative waveguide according to FIG. 1 with two laser beams for clarifying the interaction of the laser beams with each other.

Finally and with the respect to FIGS. 8a and 8b, a comparison of the interaction of laser beams in the respective waveguides is shown. FIG. 8a shows the waveguide 7 with straight inner faces as well as an entry end 8 and an exit end 9. FIG. 8b shows the embodiment of the inventive waveguide 20. Based on this comparison it can be clearly seen that the interaction between the laser beams in the waveguide 20 is remarkably reduced compared to the waveguide 7 with straight inner faces, which contributes further to the improvement of the waveguide.

An advantage of this embodiment of the waveguide 20 is thus that the beams of the laser light have less interaction with each other in the waveguide 20 compared to a waveguide 7 with straight inner faces and the laser light can be bundled more powerful at the exit end by means of the waveguide 20. Due to this, an especially homogeneous power density distribution can be achieved at the welding seam by means of the waveguide and a larger tolerance between waveguide 20 and the components to be welded can be compensated which increases the simplicity of the usage of an arrangement using the waveguide 20.

Figure 9:
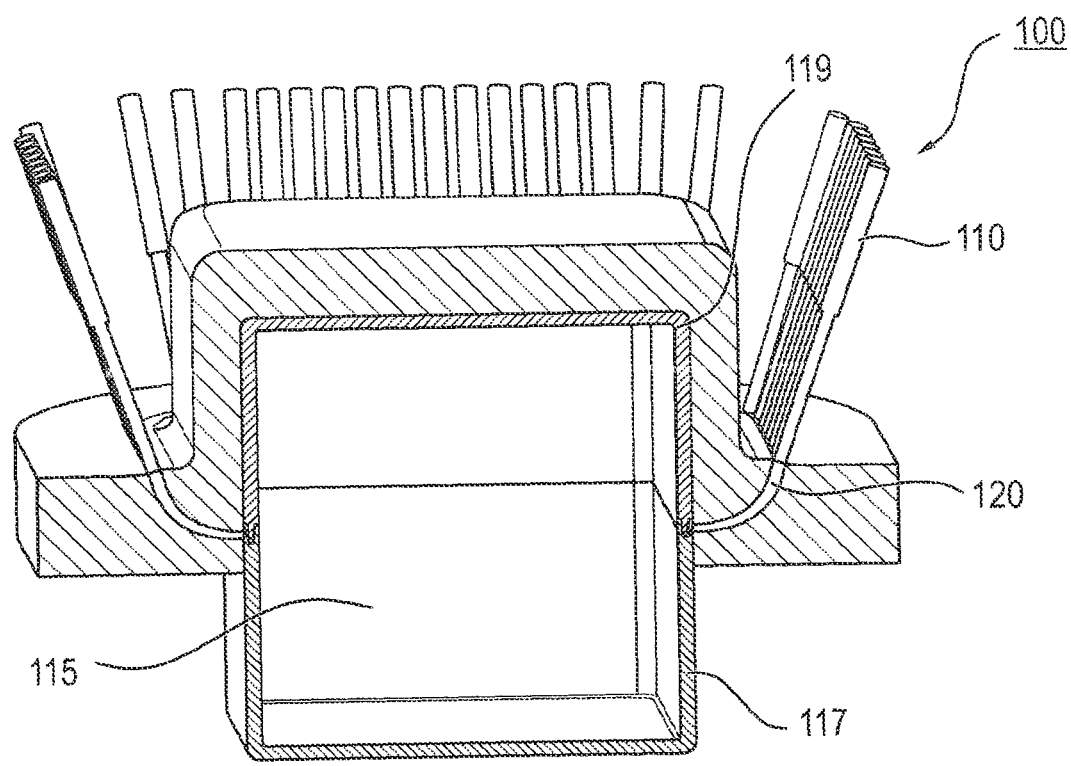
FIG. 9 is a perspective view of an arrangement for plastic welding with a section through an embodiment of a second negative waveguide according to the present invention.
Figure 10:
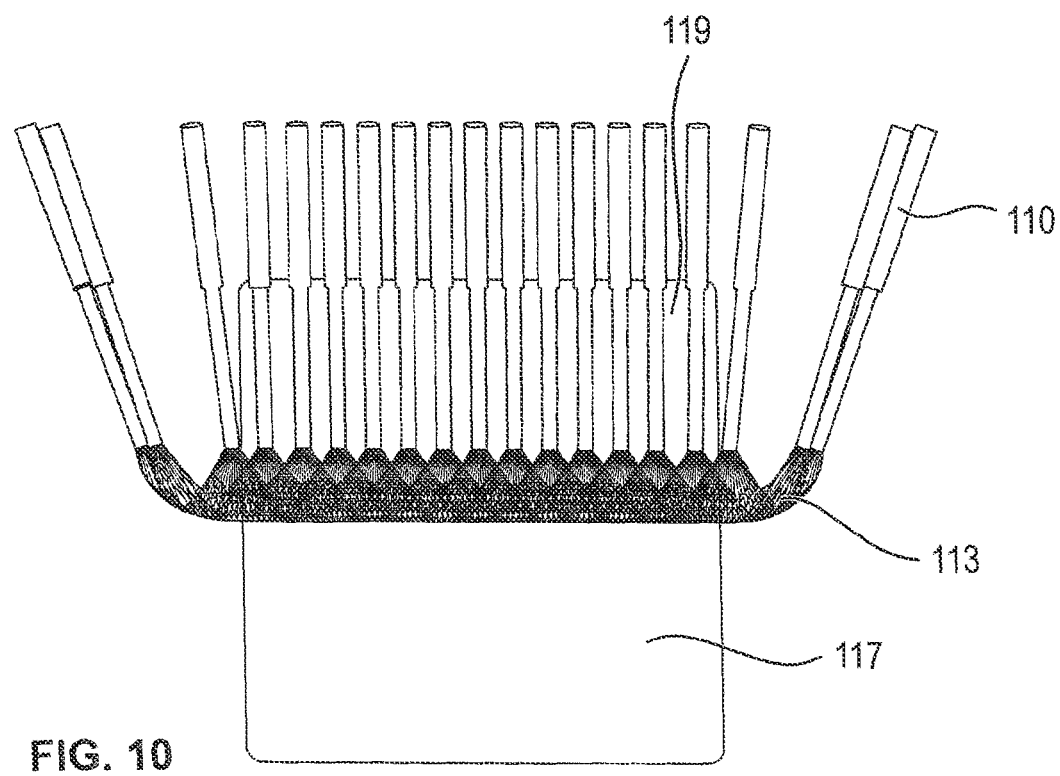
FIG. 10 shows a course of laser light through the embodiment of the second negative waveguide according to FIG. 9.
Figure 11:
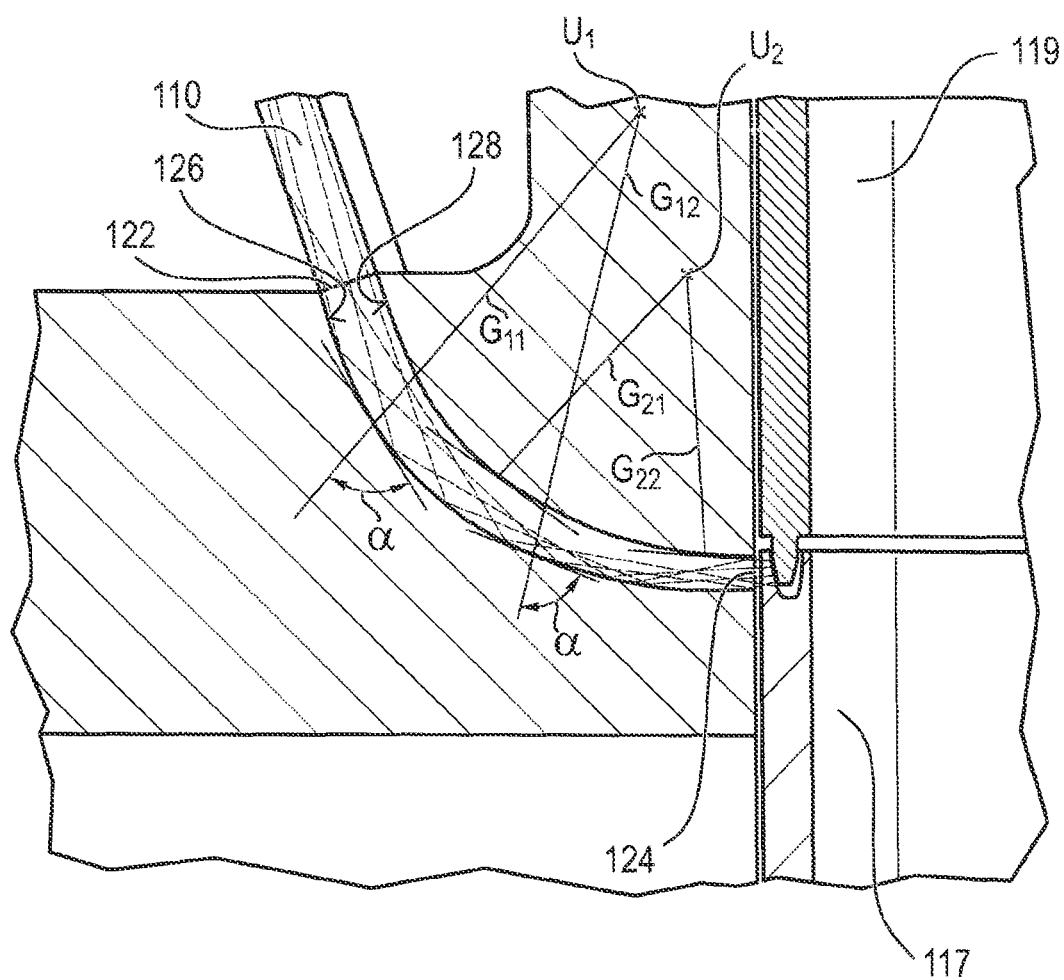
FIG. 11 is a cross-sectional view of the embodiment of the second negative waveguide according to FIG. 10.

Now referring to FIG. 9, an embodiment of an arrangement 100 for plastic welding with an embodiment of a second negative waveguide 120 according to the present invention is shown in perspective sectional view. In the arrangement 100, laser light is guided via a plurality of preferably flexible light guides 110 to the waveguide 120. The light guides 110 are connected at an entry end 122 with the waveguide 120, as shown in FIG. 11. The laser light is guided through the waveguide 120 to the components 115 to be welded, one of which is the transmission component 117 and the other of which is the absorption component 119. To this end, it is an object of the waveguide 120 to homogenize the laser light from the light guides 110 so that the power density distribution of the laser light in the welding zone or at the welding seam is as uniformly as possible. As can be especially seen based on FIGS. 11 and 12, upon welding of the two components 117 and 119, an undercut has to be considered which is formed by the protrusion of the absorption component 119 into a respective recess of the transmission component 117. For a better understanding of the following explanations, FIG. 10 shows the course 113 of the laser light through the waveguide 120 during operation of the arrangement 100.

Figure 12:
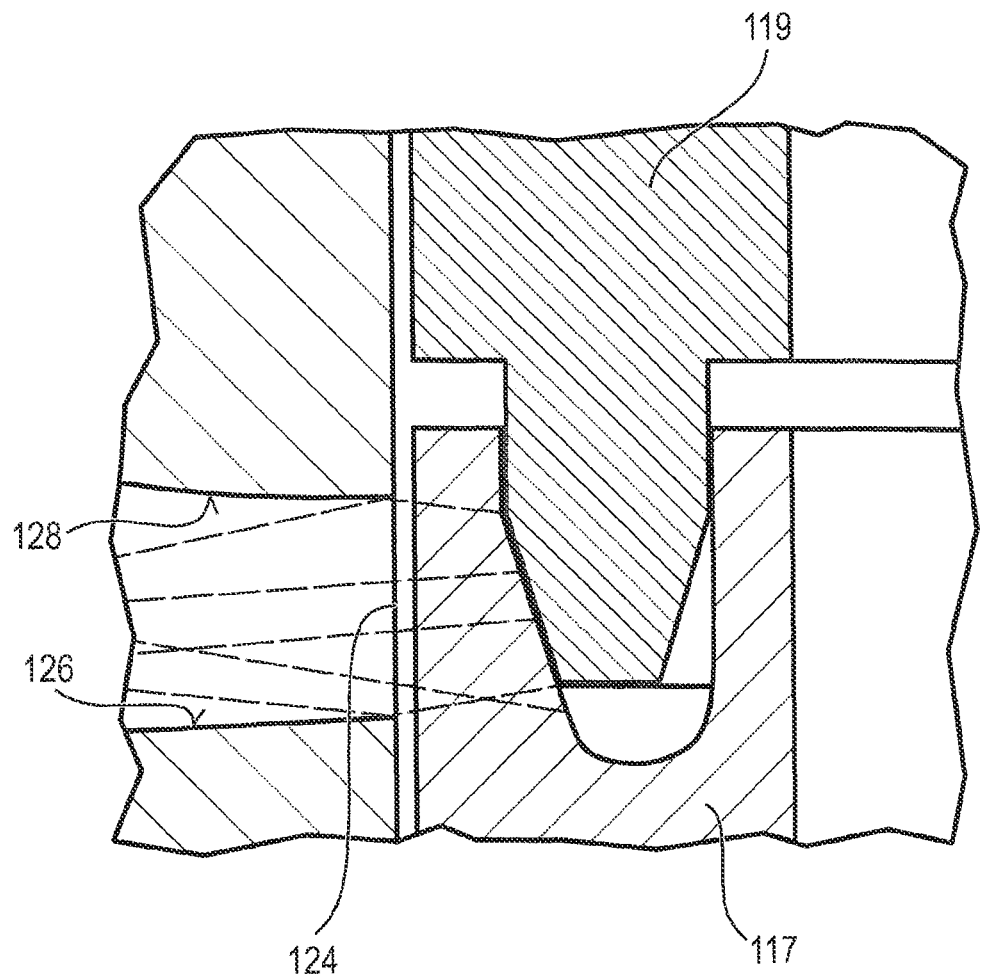
FIG. 12 shows an enlarged view of a section of FIG. 11.

Referring to FIGS. 11 and 12, the detailed construction of the waveguide 120 is explained. The waveguide 120 comprises the entry end 122 defining an entry face for the laser light and the exit end 124 defining an exit face for the laser light. A first 126 and a second inner face 128 extend between the entry end 122 and the exit end 124. The two inner faces 126 and 128 are arranged opposite to each other and reflect the laser light during operation of the arrangement 100. In other embodiments, the second inner face 128 is a straight line between the entry end 122 and the exit end 124 or consists of a plurality of straight sections. At the embodiment with straight segments as well as at the curved embodiment, it may be that the space between the first 126 and the second inner face 128 is not larger as the space at a second inner face 128 extending straightly between entry end 122 and exit end 124. A curvature of the second inner face 128 is thus convex.

The entry face of the entry end 122 is defined by the plane in which the first ends of the first 126 and second inner face 128 are arranged at the entry end 122 of the waveguide 120. In the embodiment shown, the laser light enters the waveguide 120 perpendicular to the entry face at the entry end 122. The exit end 24 with the exit face is defined, analogously to the entry face, by the plane in which the second ends of the first 126 and the second inner face 128 are arranged at the exit end 124 of the waveguide 120. In the embodiment shown, the exit face and the entry face enclose an angle at about 70°. Generally it is advantageous if the angle enclosed between entry end 122 and exit end 124 is in a range of 30° to 150°, preferably 40° to 120°. The laser light from the light guide 110 enters the waveguide 120 preferably perpendicular to the entry face.

The waveguide 120 with the entry end 122 and the exit end 124 is adapted in the embodiment shown to a desired seam contour of the components 115 to be welded. The waveguide 120 has thus a rectangular shape with rounded edges and encloses thus the components 115 to be welded, as shown in FIG. 9.

Due to the configuration of the waveguide 120 as negative waveguide 120, a cavity is present between the two inner faces 126 and 128 and the two inner faces are provided with a reflecting layer. Usually, the negative waveguide 120 has thus a channel like shape. In case of a positive waveguide consisting of a solid state, no cavity would be present between the two inner faces, as has been explained initially. At the respective positive waveguide, it is ensured by the choice of the appropriate material that total reflection occurs in the interior of the waveguide, especially at the inner faces.

A first distance between the entry end 122 and the exit end 124 defines a length L of the waveguide 120. Preferably, this length is not defined by a straight line between entry end 122 and exit end 124 but by a way of the laser light in the waveguide 120, especially by a guide beam along a central plane M, is explained below. A second distance between the first 126 and the second inner face 128 defines a thickness D of the waveguide 120. The thickness D of the waveguide 120 decreases continuously form the entry end 122 in the direction of the exit end 124. In this way, a further focus effect of the laser light from the entry end 122 in the direction of the exit end 124 is achieved.

As can be especially seen based on FIGS. 9 and 11, the first inner face 126 has a continuously curved concave shape. This continuously curved concave shape is in the embodiment shown part of a first spiral. Due to this shaping of the first inner face 126, a radius of the first spiral varies continuously from a point of origin $U_1$ of the first spiral to the first inner face 126 along the waveguide 120. The point of origin $U_1$ of the first spiral is defined by an intersection of two straight lines spaced apart from each other, extending from the first inner face 126 and which are arranged in a common cross-sectional plane of the waveguide 120. A spiral as two-dimensional figure is generally defined in that the radius varies continuously starting from the point of origin. This distinguishes the spiral for example from a circle, wherein the radius is always constant.

In the embodiment shown, the shape of the first inner face 124 is part of a logarithmic spiral which is based on the Fibonacci-sequence. A logarithmic spiral is defined as a curve, which intersects all beams or straight lines extending from the point of origin 0 in the same angle α. Thus, in the case of a logarithmic spiral and if a partial section of the spiral is present, the point of origin can be determined, in case the angle α is known. As a spiral is a two-dimensional figure, the waveguide has to be viewed in cross-section. A direction vector of the straight line extends in that case from the first inner face in the direction of the second inner face. In case the shape of the second inner face is also based on a spiral, such as in the embodiment shown, the direction vector of the respective straight line extends away from the first inner face. Exemplarily straight lines $G_{11}$, $G_{12}$, $G_{21}$ and $G_{22}$, which intersect each other in the respective point of origin $U_1$ or $U_2$, are shown for clarity reasons in FIG. 11. The equation of the logarithmic spiral in polar coordinates are $\rho = ae^{k\varphi}$ with a>0, wherein k=cot(α). The radius of curvature r of the logarithmic spiral is defined as $r = \sqrt{1+(\cot(\alpha))^2}\rho$. The zero point is the asymptotic point of the curve. The length of the curve between the first end and the second end of the first inner face and/or the second inner face is in the case of the logarithmic spiral $$L = \frac{\sqrt{1+k^2}}{k}(\rho_2 - \rho_1).$$

At a waveguide 120 being already present, this length can be measured.

Other spiral types can be used also. According to an alternative, an Archimedean spiral is used as first spiral. A curve which results from a movement of a point with a constant velocity υ on a beam which revolves around the point of origin in a constant angular velocity ω is denoted as Archimedean spiral. The equation of the Archimedean spiral in polar coordinates is $$\rho = a\varphi \text{ with } a = \frac{\upsilon}{\omega} \text{ and } a > 0.$$

For or me radius of curvature r of the Archimedean spiral it applies $$r = a\frac{(\varphi^2 + 1)^{3/2}}{\varphi^2 + 2}.$$

In a further alternative, a hyperbolic spiral is used as first spiral. The curve of the hyperbolic spiral consists of two branches which extend symmetrically to the y-axis. For both branches, the straight line y=a is the asymptote and the point of origin is asymptotic point. The equation of the hyperbolic spiral in polar coordinates is $$\rho = \frac{a}{\varphi}$$

with a>0. For the radius of curvature r of the hyperbolic spiral it applies $$r = \frac{a}{\varphi}\left(\frac{\sqrt{1+\varphi^2}}{\varphi}\right)^3.$$

In the embodiment shown, the radius of the first spiral decreases continuously from the point of origin $U_1$ of the first spiral to the first inner face 126 along the waveguide 120 from the entry end 122 to the exit end 124. In another embodiment, the radius increases continuously in this course of direction. Based on the angle between entry end 122 and exit end 124 which is desired for a respective application, for example due to undercuts being present at the components 115 to be welded or the available installation space, the desired section of the spiral can be chosen to realize the concave shape of the first inner face 126.

Between the first 126 and the second inner face 128, a central plane is defined, the distance of which is constant with respect to the first 126 and the second inner face 128 along the length of the waveguide 120 so that the second inner face 128 also has a continuously curved shape. This shape of the second inner face 128 is part of a second spiral, especially a second natural spiral, so that a radius of the second spiral varies continuously from a point of origin $U_2$ of the second spiral to the second inner face 128 along the waveguide 120. The point of origin $U_2$ is determined analogously to the point of origin $U_1$ of the first spiral, as described above. Due to this configuration, laser light can be guided very effectively within the waveguide 120.

Figure 13:
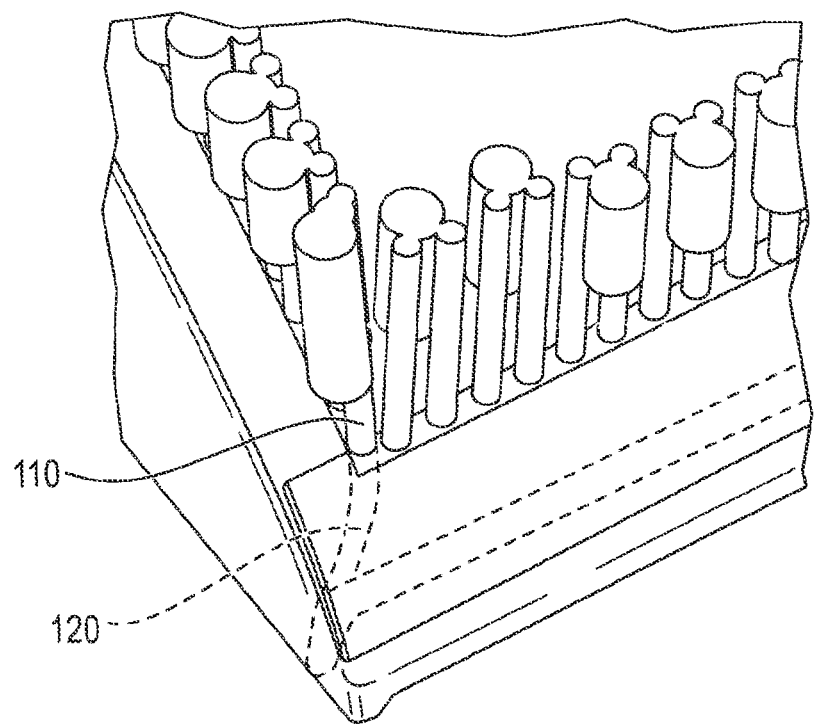
FIG. 13 is a schematic depiction of the usage of the embodiment of the second negative waveguide for avoiding a collision of light guides in the cornered area.

A length of the first inner face of the waveguide 120 is in the range of 3-times to 4-times, especially of 3.5-times, of a distance between the individual light guides 110 from the plurality of light guides 110. In this way, an especially compact construction of the waveguide can be achieved and a collision of the light guides 110 in corner portions can be avoided, as schematically shown in FIG. 13.

Figure 14:
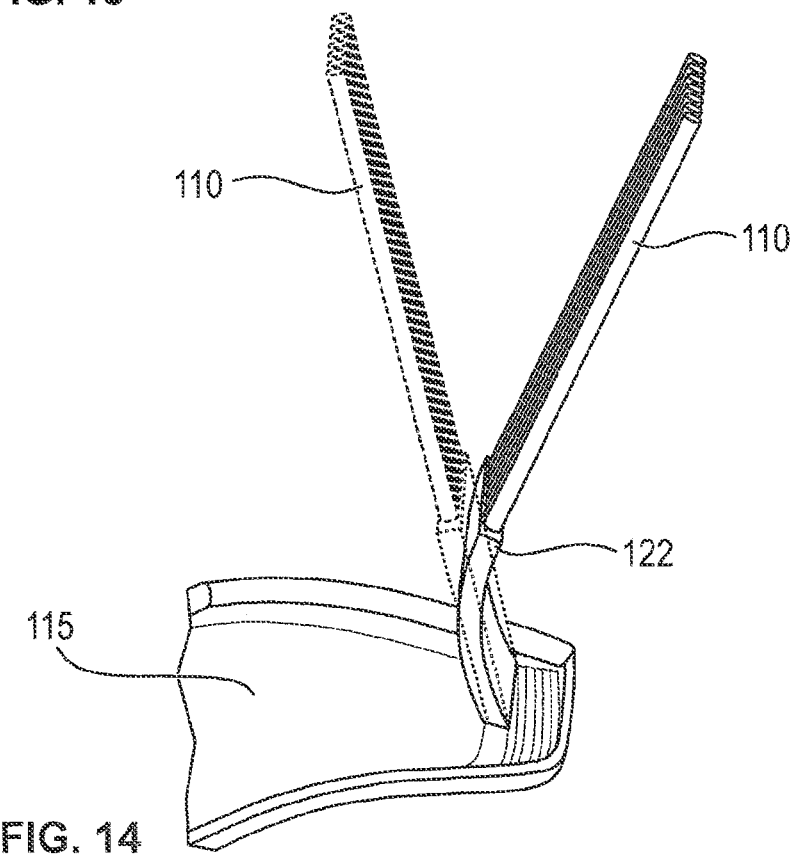
FIG. 14 is an overlapping view of a waveguide according to the prior art and the embodiment of the second negative waveguide.

For the sake of completeness, FIG. 14 shows an overlapping view of a waveguide having straightly extending inner faces and the waveguide 120 as it has been described above.

An advantage of the waveguide 120 is that lower energy losses occur in the interior of the waveguide 120 and the laser light can be guided especially effectively through the waveguide 120 to a welding seam. Thereby, and compared to known waveguides, more welding energy is provided at the weld seam of the components 115, especially if the components have an undercut at the welding seam. Further, and with respect to a closed angular or cornered shape of the entry end 122 and the exit end 124, the light guides 110 can be incorporated more effectively into an arrangement 100 for laser welding, especially at the corners, due to the spiral shape of the first inner face as collisions of the light guides 110 at the corners are reduced.

Figure 15:
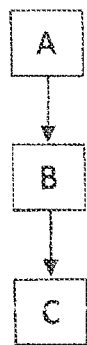
FIG. 15 is a flow chart of an embodiment of a welding method.

Now referring to FIG. 15, a flow chart of an embodiment of a welding method is shown. The method for plastic welding, especially for laser transmission welding, with one of the above described arrangements 1; 100 comprises first of all the step of arranging (step A) two plastic components to be welded to each other in a mounting device. Thereafter, the step of creating (step B) laser light by means of a laser light source follows. Here, the laser light passes through the light guide 110, may be a plurality of light guides 110, and subsequently through one of the above described waveguides 20; 120. In step C, the welding of the plastic components to be welded to each other by means of the laser light exiting the waveguide 20; 120 occurs.

Figure 16:
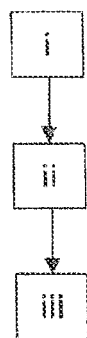
FIG. 16 is a flow chart of an embodiment of a manufacturing method of a negative waveguide.

FIG. 16 shows an embodiment of a manufacturing method of a negative waveguide. In step i, the providing of a first and a second inner face for the later waveguide takes place. In a second step ii, an applying of a reflecting layer onto the first and the second inner face takes place. Alternatively, the first and the second inner face may already be provided with a reflecting layer. In the third step iii, the first and the second inner face will be arranged such that they are opposite to each other. A first end of the first and the second inner face defines an entry end of the waveguide, which defines an entry face for laser light, and a second end of the first and the second inner face defines an exit end of the waveguide, which defines an exit face for laser light. A first distance between the entry end and the exit end defines a length of the waveguide and a second distance between the first and the second inner face defines a thickness of the waveguide.

Depending on the waveguide 20; 120 to be manufactured, the steps of the manufacturing method vary. In a first alternative and for manufacturing the waveguide 20, the inner faces will be arranged in step iii such that the exit end is arranged opposite to the entry end and a central plane of the waveguide extends centrally from the entry end to the exit end. To this end, the first inner face was provided with a continuously curved concave shape or has been brought into such a shape prior to the coating. A third distance between the first inner face and the central plane of the waveguide varies in this case continuously from the entry end in the direction of the exit end.

In a second alternative, the first inner face was provided with a continuously curved concave shape or has been brought into such a shape, which is part of a first spiral, especially a first natural spiral. A radius of the first spiral varies continuously from a point of origin of the first spiral to the first inner face along the waveguide. In this alternative, step iii is thus omitted.

Figure 17:
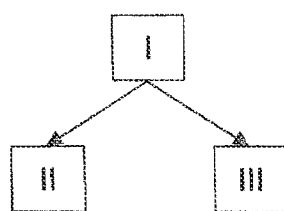
FIG. 17 is a flow chart of an embodiment of a manufacturing method of a positive waveguide.

FIG. 17 shows a flow chart of an embodiment of a manufacturing method of a positive waveguide according to the invention. Here, in contrast to the manufacturing method according to FIG. 16, a solid state of a light guiding material is provided in a first step I. The solid state comprises an entry end defining an entry face for laser light and an exit end defining an exit face for laser light. Further, the solid state has a first side face defining a first inner face and a second side face defining a second inner face. The first and the second inner face are arranged opposite to each other and the solid state consists of a material which realizes a total reflection of laser light at the first and the second inner face. A first distance between the entry end and the exit end defines a length of the waveguide and a second distance between the first and the second inner face defines a thickness of the waveguide.

Depending on the waveguide to be manufactured, the steps of the manufacturing method differ. In a first alternative and for producing a waveguide, the inner face of which has a shape being part of an ellipse, the exit end is arranged opposite to the entry end and a central plane of the waveguide extends centrally from the entry end to the exit end. The method then comprises as second step II the forming of the first side face such that the first inner face has a continuously curved concave shape so that a third distance between the first inner face and the central plane of the waveguide varies continuously from the entry end in the direction of the exit end.

In a second alternative and for manufacturing a waveguide, the inner face of which has a shape being part of a spiral, the method comprises the third step III of forming the first side face such that the first inner face has a continuously curved concave shape which is part of a first spiral, especially a first natural spiral. A radius of the first spiral varies here continuously from a point of origin of the first spiral to the first inner face along the waveguide.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

LIST OF SOME EMBODIMENTS

1. A negative waveguide for plastic welding, especially for laser transmission welding, comprising:
   an entry end defining an entry face for laser light,
   an exit end defining an exit face for laser light as well as
   a first and a second inner face which are arranged between the entry end and the exit end, which are arranged opposite to each other and by means of which laser light can be reflected, wherein
   a first distance between the entry end and the exit end defines a length of the waveguide and a second distance between the first and the second inner face defines a thickness of the waveguide, wherein
   the exit end is arranged opposite to the entry end and a central plane of the waveguide extends centrally from the entry end to the exit end, and
   the first inner face comprises a continuously curved, concave shape so that a third distance between the first inner face and the central plane of the waveguide varies continuously from the entry end in the direction of the exit end.

2. A positive waveguide for plastic welding, especially for laser transmission welding, comprising:
   an entry end defining an entry face for laser light,
   an exit end defining an exit face for laser light as well as
   a first and a second inner face which are arranged between the entry end and the exit end, which are arranged opposite to each other and by means of which laser light can be reflected, wherein
   a first distance between the entry end and the exit end defines a length of the waveguide and a second distance between the first and the second inner face defines a thickness of the waveguide, wherein the exit end is arranged opposite to the entry end and a central plane of the waveguide extends centrally from the entry end to the exit end, and the first inner face comprises a continuously curved, concave shape so that a third distance between the first inner face and the central plane of the waveguide varies continuously from the entry end in the direction of the exit end.

3. Waveguide according to embodiment 1 or 2, in which the third distance increases or decreases continuously from the entry end in the direction of the exit end.

4. Waveguide according to one of the preceding embodiments, in which the second inner face is formed mirror-symmetrically to the first inner face so that the second inner face has a continuously curved concave shape and a fourth distance between the second inner face and the central plane of the waveguide varies continuously from the entry end in the direction of the exit end.

5. Waveguide according to one of the preceding embodiments, in which the thickness at the entry end is between 8% and 25%, preferably 10% to 20% of the length of the waveguide.

6. Waveguide according to one of the preceding embodiments, in which the third distance increases from the entry end in the direction of the exit end up to an apex and decreases thereafter, wherein the apex is arranged with respect to the length in a range between ¼ and ¾ of the length of the waveguide, preferably in a range between ⅓ and ⅔ and especially preferred at about ½.

7. Waveguide according to one of the preceding embodiments, in which the thickness at the exit end is equal to the thickness at the entry end.

8. Waveguide according to one of the preceding embodiments, in which the third distance increases from the entry end in the direction of the exit end up to an apex and decreases thereafter, wherein the thickness in the apex is about 1.2- to 2-times, preferably 1.4- to 1.8-times and especially preferred 1.6-times the thickness at the entry end.

9. Waveguide according to one of the preceding embodiments, in which the continuously curved concave shape of the first inner face is part of an ellipse.

10. A negative waveguide for plastic welding, especially for laser transmission welding comprising:
an entry end defining an entry face for laser light,
an exit end defining an exit face for laser light as well as
a first and a second inner face which are arranged between the entry end and the exit end, which are arranged opposite to each other and by means of which laser light can be reflected, wherein
a first distance between the entry end and the exit end defines a length of the waveguide and a second distance between the first and the second inner face defines the thickness of the waveguide, and
the first inner face comprises a continuously curved concave shape which is part of a first spiral, especially a first natural spiral, so that a radius of the first spiral from a point of origin of the first spiral to the first inner face varies continuously along the waveguide.

11. A positive waveguide for plastic welding, especially for laser transmission welding comprising:
an entry end defining an entry face for laser light,
an exit end defining an exit face for laser light as well as
a first and a second inner face which are arranged between the entry end and the exit end, which are arranged opposite to each other and by means of which laser light can be reflected, wherein
a first distance between the entry end and the exit end defines a length of the waveguide and a second distance between the first and the second inner face defines the thickness of the waveguide, and
the first inner face comprises a continuously curved concave shape which is part of a first spiral, especially a first natural spiral, so that a radius of the first spiral from a point of origin of the first spiral to the first inner face varies continuously along the waveguide.

12. Waveguide according to one of the embodiments 10 or 11, in which the radius of the first spiral increases or decreases continuously from the point of origin of the first spiral to the first inner face along the waveguide from the entry end in the direction of the exit end.

13. Waveguide according to one of the embodiments 10 to 12, wherein an angle in the range of 30° to 150°, preferably 40° to 120° is enclosed between the entry end and the exit end.

14. Waveguide according to one of the embodiments 10 to 13, in which a central plane is defined between the first and the second inner face, the distance of which is constant to the first and the second inner face along the length of the waveguide so that the second inner face also has a continuously curved shape which is part of a second spiral, especially a second natural spiral, so that a radius of the second spiral from a point of origin of the second spiral to the second inner face varies continuously along the wave guide.

15. Waveguide according to one of the embodiments 10 to 14, in which the thickness of the waveguide decreases continuously from the entry end in the direction of the exit end.

16. Waveguide according to one of the embodiments 10 to 15, wherein the concave continuously curved shape, which is part of a spiral, is chosen from one of the following spiral types: hyperbolic, Archimedean, logarithmic or from a spiral based on the Fibonacci-sequence.

17. A negative waveguide for plastic welding, especially for laser transmission welding comprising:
an entry end defining an entry face for laser light,
an exit end defining an exit face for laser light as well as
a first and a second inner face which are arranged between the entry end and the exit end, which are arranged opposite to each other and by means of which laser light can be reflected, wherein
a first distance between the entry end and the exit end defines a length of the waveguide and a second distance between the first and the second inner face defines the thickness of the waveguide, and
the first inner face comprises a continuously curved concave shape which is part of a first curve.

18. A positive waveguide for plastic welding, especially for laser transmission welding comprising:
an entry end defining an entry face for laser light,
an exit end defining an exit face for laser light as well as
a first and a second inner face which are arranged between the entry end and the exit end, which are arranged opposite to each other and by means of which laser light can be reflected, wherein
a first distance between the entry end and the exit end defines a length of the waveguide and a second distance between the first and the second inner face defines the thickness of the waveguide, and
the first inner face comprises a continuously curved concave shape which is part of a first curve.

19. Arrangement for plastic welding, especially for laser transmission welding, comprising:
a laser light source,
a light guide, preferably a plurality of light guides, and a waveguide according to one of the preceding embodiments 1 to 18, wherein in the operation of the arrangement the laser light passes from the laser light source through the light guide and subsequently through the waveguide.

20. Arrangement according to embodiment 19, using a waveguide according to one of the embodiments 10 to 18 as well as a plurality of waveguides, wherein a length of the first inner face of the waveguide is in the range of 3-times to 4-times, especially of 3.5-times, of a distance between the individual light guides from the plurality of light guides.

21. Method for plastic welding, especially for laser transmission welding, with an arrangement according to one of the embodiments 19 or 20, comprising the following steps:
   a. arranging two plastic components to be welded to each other in a mounting device,
   b. creating laser light by means of a laser light source, wherein the laser light passes through the light guide, preferably a plurality of light guides, and subsequently through a waveguide according to one of the embodiments 1 to 18, and
   c. welding the plastic components to be welded to each other by means of the laser light exiting the waveguide.

22. Manufacturing method of a negative waveguide according to one of the embodiments 1, 3 to 9 in combination with 1, 10, 12 to 16 in combination with 10, or 17, comprising the steps:
   a. providing a first and a second inner face,
   b. applying a reflecting layer on the first and the second inner face,
   c. arranging the first and the second inner face such that they are opposite to each other, wherein
   d. a first end of the first and the second inner face define an entry end of the waveguide, which defines an entry face for laser light, and a second end of the first and the second inner face define an exit end of the waveguide, which defines an exit face for laser light, wherein
   e. a first distance between the entry end and the exit end defines a length of the waveguide and a second distance between the first and the second inner face defines a thickness of the waveguide, wherein
   f1. the exit end is arranged opposite to the entry end and a central plane of the waveguide extends centrally from the entry end to the exit end while the first inner face has a continuously curved concave shape so that a third distance between the first inner face and the central plane of the waveguide varies continuously from the entry end in the direction of the exit end or
   f2. the first inner face has a continuously curved concave shape which is part of a first spiral, especially a first natural spiral so that the radius of the first spiral varies continuously from a point of origin of the first spiral to the first inner face along the waveguide or
   f3. the first inner face has a continuously curved concave shape which is part of a first curve.

23. Manufacturing method of a positive waveguide according to one of the embodiments 2, 3 to 9 in combination with 2, 11, 12 to 16 in combination with 11, or 18, comprising the steps:
   a. providing a solid state of a light guiding material, wherein the solid state comprises an entry end defining an entry face for laser light and an exit end defining an exit face for laser light, wherein
   b. the solid state has a first side face defining a first inner face and a second side face defining a second inner face wherein the first and the second inner face are arranged opposite to each other and the solid state consists of a material which provides a total reflection of laser light at the first and the second inner face while
   c. a first distance between the entry end and the exit end defines a length of the waveguide and a second distance between the first and the second inner face defines a thickness of the waveguide, wherein
   d1. the exit end is arranged opposite to the entry end and a central plane of the waveguide extends centrally from the entry end to the exit end and the method comprises the step: forming the first side face such that the first inner face has a continuously curved concave shape so that a third distance between the first inner face and the central plane of the waveguide varies continuously from the entry end in the direction of the exit end or
   d2. the method comprises the further step of: forming the first side face such that the first inner face has a continuously curved concave shape which is part of a first spiral, especially a first natural spiral, so that a radius of the first spiral from a point of origin of the first spiral to the first inner face varies continuously along the waveguide or
   d3. the method comprises the further step of: forming the first side face such that the first inner face has a continuously curved concave shape which is part of a first curve.

The invention claimed is:
1. Method for plastic welding with an arrangement comprising a laser light source, a light guide and a waveguide, wherein the waveguide is a negative waveguide comprising an entry end defining an entry face for laser light, an exit end defining an exit face for laser light as well as a first and a second inner face which are arranged between the entry end and the exit end, which are arranged opposite to each other and by means of which laser light can be reflected, wherein a first distance between the entry end and the exit end defines a length of the waveguide and a cavity is present between the first and the second inner face through which laser light is guidable, and a second distance between the first and the second inner face defines a thickness of the waveguide, wherein the waveguide further realizes one of the following features:
   i) the exit end is arranged opposite to the entry end and a central plane of the waveguide extends centrally from the entry end to the exit end, and the first inner face comprises a continuously curved, concave shape so that a third distance between the first inner face and the central plane of the waveguide varies continuously from the entry end in the direction of the exit end, in which the third distance increases from the entry end in the direction of the exit end up to an apex and decreases thereafter and the continuously curved concave shape of the first inner face is part of an ellipse, or
   ii) the first inner face comprises a continuously curved concave shape which is part of a first spiral so that a radius of the first spiral from a point of origin of the first spiral to the first inner face varies continuously along the waveguide, the second inner face comprises a continuously curved convex shape which is part of a second spiral, so that a radius of the second spiral from a point of origin of the second spiral to the second inner face varies continuously along the waveguide, wherein the thickness of the waveguide decreases continuously from the entry end in the direction of the exit end and an angle in the range of 30° to 150° is enclosed between the entry end and the exit end wherein the method comprises the following steps:
      a. arranging two plastic components to be welded to each other in a mounting device, b. creating laser light by means of the laser light source, wherein the laser light passes through the light guide, and subsequently through the waveguide, and c. welding the plastic components to be welded to each other by means of the laser light exiting the waveguide.

2. Method for plastic welding according to claim 1 with feature i), wherein the second inner face is formed mirror-symmetrically to the first inner face so that the second inner face has a continuously curved concave shape and a fourth distance between the second inner face and the central plane of the waveguide varies continuously from the entry end in the direction of the exit end.

3. Method for plastic welding according to claim 1 with feature i), wherein the thickness at the entry end is between 8% and 25% of the length of the waveguide.

4. Method for plastic welding according to claim 1 with feature i), wherein the apex is arranged with respect to the length in a range between ¼ and ¾ of the length of the waveguide.

5. Method for plastic welding according to claim 1 with feature i), wherein the thickness at the exit end is equal to the thickness at the entry end.

6. Method for plastic welding according to claim 1 with feature i), wherein the thickness in the apex is about 1.2- to 2-times the thickness at the entry end.

7. Method for plastic welding according to claim 1 with feature ii), wherein the radius of the first spiral increases or decreases continuously from the point of origin of the first spiral to the first inner face along the waveguide from the entry end in the direction of the exit end.

8. Method for plastic welding according to claim 1 with feature ii), wherein a central plane is defined between the first and the second inner face, the distance of which is constant to the first and the second inner face along the length of the waveguide so that the second inner face also has a continuously curved shape which is part of a second spiral so that a radius of the second spiral from a point of origin of the second spiral to the second inner face varies continuously along the wave guide.

9. Method for plastic welding according to claim 1 with feature ii), wherein the concave continuously curved shape, which is part of a spiral, is chosen from one of the following spiral types: hyperbolic, Archimedean, logarithmic or from a spiral based on the Fibonacci-sequence.

10. Method for plastic welding according to claim 1 with feature ii), wherein the arrangement has a plurality of light guides and a length of the first inner face of the waveguide is in the range of 3-times to 4-times of a distance between the individual light guides from the plurality of light guides.

11. Manufacturing method of a negative waveguide, comprising the steps:

a. providing a first and a second inner face, b. applying a reflecting layer on the first and the second inner face, c. arranging the first and the second inner face such that they are opposite to each other, wherein d. a first end of the first and the second inner face define an entry end of the waveguide, which defines an entry face for laser light, and a second end of the first and the second inner face define an exit end of the waveguide, which defines an exit face for laser light, wherein e. a first distance between the entry end and the exit end defines a length of the waveguide and a cavity is present between the first and the second inner face through which laser light is guidable, and a second distance between the first and the second inner face defines a thickness of the waveguide, wherein the method comprises further one of the following steps:

f1. the exit end is arranged opposite to the entry end and a central plane of the waveguide extends centrally from the entry end to the exit end while the first inner face has a continuously curved concave shape so that a third distance between the first inner face and the central plane of the waveguide varies continuously from the entry end in the direction of the exit end, and the third distance increases from the entry end in the direction of the exit end up to an apex and decreases thereafter and the continuously curved concave shape of the first inner face is part of an ellipse, or f2. the first inner face has a continuously curved concave shape which is part of a first spiral, so that the radius of the first spiral varies continuously from a point of origin of the first spiral to the first inner face along the waveguide, the second inner face comprises a continuously curved convex shape which is part of a second spiral so that a radius of the second spiral from a point of origin of the second spiral to the second inner face varies continuously along the waveguide, wherein the thickness of the waveguide decreases continuously from the entry end in the direction of the exit end and an angle in the range of 30° to 150° is enclosed between the entry end and the exit end.

* * * * *